May 30, 1950

T. M. ULSETH 2,509,461

SEAL

Filed March 22, 1946

INVENTOR.
Thomas M. Ulseth
BY
Cromwell, Greist & Warden
ATTORNEYS

Patented May 30, 1950

2,509,461

UNITED STATES PATENT OFFICE 2,509,461

SEAL

Thomas M. Ulseth, Detroit, Mich., assignor to Chicago Rawhide Manufacturing Company, Chicago, Ill., a corporation of Illinois Application March 22, 1946, Serial No. 656,441

3 Claims. (Cl. 288—3)

This invention pertains to a rotary seal adapted to be interposed between a pair of relatively rotatable, coaxial members. This application is a continuation in part of my co-pending application Serial No. 574,986, filed January 29, 1945, now Patent No. 2,478,140, granted August 2, 1949.

An object of the invention is to provide a seal of the type described which is self-contained in its entirety, having a pair of elements adapted to be secured respectively to the relatively rotatable members and coacting provisions carried by said elements internally of the seal for effecting a rotary sealing engagement.

A further object is to provide a seal of the type described in which said sealing engagement is maintained at high unit pressure, due to the particular conformation and fabrication of the elements, and in which the seal structure is extremely simple in nature.

A still further object is to provide a seal of simplified character in which it is unnecessary to dispose or locate certain parts in predetermined position for maximum efficiency, and which will compensate for eccentricity or misalignment of the relatively rotatable members without detracting from the effectiveness of operation of the seal.

A still further object is to provide a seal of the type described which is characterized by a centrifugal "slinger" action tending to clear oil or other liquid which is handled away from the sealing surface, and which functions in a manner to produce an hydraulic pressure balanced condition wherein liquid acting on one side thereof tends to augment and maintain the effectiveness of the sealing engagement.

This invention pertains to a rotary self-contained seal adapted for application to a pair of relatively rotatable members of any type, between which it is desired to establish a seal preventing the escape of a liquid, for example, oil, or entry of dirt, dust or foreign matter. For purposes of illustration, I have chosen a shaft 10 and housing 11 to represent said relatively rotatable members. However, it will be appreciated that this choice is not restrictive in any manner of the scope of the invention, which is applicable to any pair of relatively rotatable and preferably coaxial parts. Generally considered, the seal comprises a self-contained unit including components adapted to be fixedly secured respectively to the aforesaid relatively rotatable members, along with coacting means carried by said components for effecting a sealing engagement in a novel manner at high unit pressure internally of the sealing unit.

Figure 1:
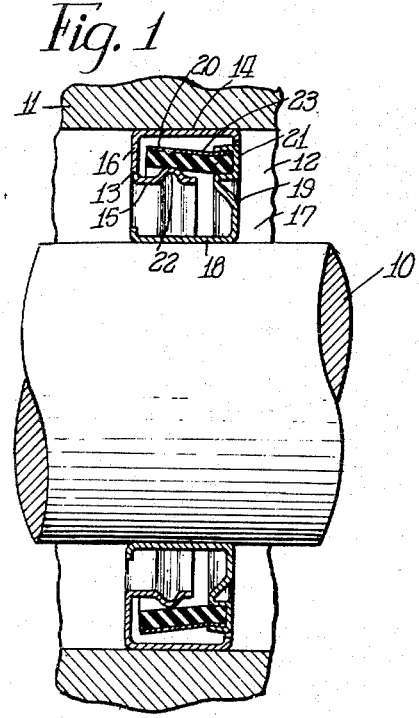
Fig. 1 is a fragmentary view in longitudinal vertical section, illustrating one embodiment of the present seal as applied to a pair of relatively rotatable members; i. e., a shaft and housing.
Figure 2:
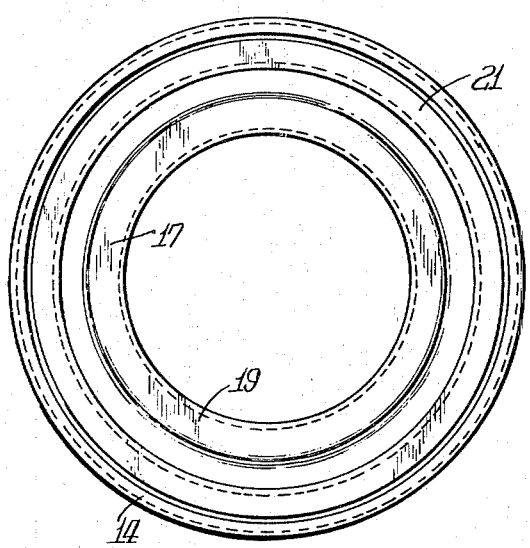
Fig. 2 is an end view of the seal construction.

In the embodiment of the invention illustrated in Figs. 1 and 2, the seal 12 comprises an annular outer casing member 13 which may be stamped from sheet metal and is generally U-shaped in section. Member 13 provides an outer peripheral, axially extending wall 14 which has a fixed press fit in the housing 11, an inner re-entrant flange 15 which extends axially and constitutes a sealing element, and a radial connecting wall 16. The reference numeral 17 designates an inner annular sheet metal casing member which is generally L-shaped in section, presenting an inner peripheral wall 18 adapted to be press fitted on the shaft 10 and a radial flange 19.

The flange 19 is conformed to provide an annular channel at its outer extremity serving to grip one end of a packing element 20 fabricated of leather or other appropriate packing or sealing material. This packing element 20 is sleeve-like and elongated in the axial direction; one end thereof is positively clamped in the channel 21 in radial wall 19, so that the sleeve-like packing element is rotatable with inner casing member 17 and shaft 10 in concentric relation to the latter.

The re-entrant flanged sealing element 15, is, in the embodiment illustrated in Figs. 1 and 2, provided with a continuous annular rib 22 projecting radially therefrom for sealing engagement with packing element 20 at a point intermediate the axial length of the latter. This rib 22 is shown spun or similarly offset radially outwardly and has interior engagement with the adjacent surface of packing element 20; however, it will be appreciated that the radial direction of the rib might well be reversed for radial engagement with the packing element externally of the latter if circumstances indicate the desirability of this modification. The important point is that the rib sealingly engages the packing element intermediate the length of said element and that the latter has a free end at one side of the rib, being positively clamped at the opposite side. This characteristic applies to all the embodiments of the invention.

A suitable resilient element such as a finger spring 23 clamped in channel 21 with packing element 20 serves to maintain the sealing engagement of said element with the rib. However, the seal is further hydraulically balanced in the manner to be described.

In operation, it will be appreciated that the packing element 20 rotates with shaft 10 relative to the fixed annular rib 22. Said packing element is proportioned to exert a substantial compressive or constrictive force on the rib, the degree of which is readily ascertainable in accordance with the requirements of the installation. I find it desirable to position the grain side of the leather packing element 20 in engagement with sealing rib 22 and furthermore the seal should preferably be positioned in such manner that the liquid or oil to be sealed, if under pressure, exerts such pressure on the side of the packing element opposite the rib, thereby producing a balanced arrangement wherein the hydraulic pressure offsets the effect of centrifugal force on the packing element.

My improved seal has the advantage that it is unnecessary to provide for a specific wiping lip or comparable element, or to take pains to position such a lip with particularity when the seal is installed. Quite obviously, any point lengthwise of the sealing surface of the packing element constitutes a proper point for rotary sealing engagement with the rib. Furthermore, the sealing engagement is under relatively high unit pressure, since it constitutes almost a line engagement as distinguished from an area engagement. Moreover, end play occurring between the shaft and housing is accommodated readily by the seal without disrupting its sealing engagement; eccentricity or misalignment of the shaft is also compensated for.

Figure 3:
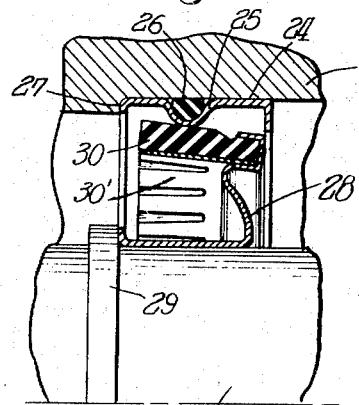

In Fig. 3 I illustrate a modified adaptation of the invention wherein the seal includes an outer casing member 24, in the form of a cupped, apertured disk, which is provided with an internally projecting radial annular sealing rib 25. The external annular concavity in the casing member which is provided by said rib is availed of as a seat for a continuous resilient packing band 26 which serves to prevent leakage externally of the casing member 24. Member 24 has a press fit in the housing 11 and in the illustrated embodiment abuts an annular internal shoulder 27 in the latter.

The internal casing member, designated 28, is generally similar to the member 17 of the above described embodiment and similarly has a press fit on the shaft 10, abutting a radial rib 29 on the latter. In this form the axially extending sleeve-like packing element 30 internally engages the sealing rib 25 with radially outward expansive force, being gripped by the inner casing member 28 in such manner that its outer elongated surface is under substantial radial compression by the rib. A spring means, such as finger spring 30', maintains appropriate sealing pressure on the rib 29, being gripped in the inner casing member along with the packing element 30. The rotary sealing action in the embodiment of Fig. 3 is similar to that shown in Fig. 1 and the seal has comparable advantages in all respects.

Figure 4:
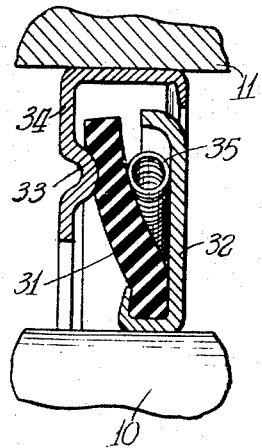
Figs. 3, 4 and 5 are views generally similar to Fig. 1, illustrating modified embodiments of the seal construction.

In Fig. 4 I illustrate a further modification which incorporates the invention. In this structure the packing element 31 is in the form of an annular disk the cross section of which is elongated radially. Packing element 31 is clamped at its inner periphery in a channeled casing member 32 which is press fitted on shaft 10, and sealingly coacts with an annular rib 33 formed in the outer casing member 34, said rib extending parallel to the axis of the seal. Member 34 is press fitted in housing 11. To augment the pressure of the packing element on sealing rib 33, I may provide a suitable spring, illustrated as a continuous annular garter spring 35, which engages between the rear surface of packing element 31 and the radial inner surface of casing member 32. This embodiment has most of the features of advantage of the preceding modifications. Though its use is somewhat restricted by the fact that it will not allow as much end play between the parts of the seal as in the other forms, hence should be employed only in cases where such end play is at a minimum or absent, it has a further advantage residing in its "slinger" action whereby liquids are thrown radially outwardly from the packing element 31 under centrifugal force. This tends to remove liquid from the sealing zone while in operation and to that extent assists in the overall sealing action.

Figure 5:
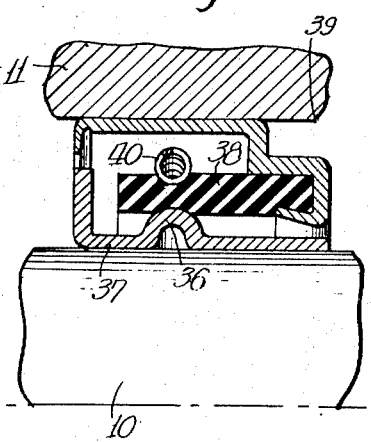

In Fig. 5 I illustrate a further modification in which the sealing rib 36 is formed on the inner casing member 37 fixedly secured to shaft 10, extending radially outwardly therefrom. I even contemplate that such a rib may be formed integrally on the shaft in which case the inner casing member can be dispensed with. The non-metallic, axially extending packing element 38 is clamped in the outer casing member 39, which is secured to housing 11, all in a manner similar to the above described structures, and has rotary sealing engagement with the rib externally thereof. To augment the force of sealing engagement, a spring means, such as the annular garter spring 40, may be employed.

Certain conditions may indicate the desirability of multiplying the number of annular sealing ribs in any of the above described forms, providing a succession of spaced sealing engagements with the leather packing element. This type of multiplication of ribs obviously falls under the scope of the invention.

In all of the embodiments a seal is provided between a non-metallic packing element of leather or other appropriate material and a relatively rotatable projecting rib of metal, the packing element being held at one end only and being engaged by the rib intermediate its length. This seal is extremely simple and inexpensive in nature, may be readily and quickly installed, requires no great degree of care in such installation since it does not rely on any particular positioning of a sealing element or surface, incorporates a desirable centrifugal "slinger" action, is self-compensating for end play, eccentricity or misalignment, and by reason of these features it gives a long and effective life of service under severe conditions.

I claim:

1. A self-contained seal for application to a pair of relatively rotatable parts, comprising a pair of annular sheet metal housing members, each adapted to be fixedly engaged respectively with one of said parts, said members being axially telescoped relative to one another and defining an annular seal housing of box-like cross section, one of the members having an axially extending portion, an annular sealing rib formed on said portion, an elongated, sleeve-like, non-metallic sealing element secured at an edge thereof to the other member and extending in a substantially axial direction for a substantial distance toward and over said rib, being in sealing engagement therewith between the edges of said sealing element, and spring means coacting with said sealing element to maintain said sealing engagement.

2. A self-contained seal for application to a pair of relatively rotatable parts, comprising a pair of annular sheet metal housing members each adapted to be fixedly engaged respectively with one of said parts, said members being axially telescoped relative to one another and defining an annular seal housing of box-like cross section, one of the members having an axially extending re-entrant portion in radially spaced relation to the part engaged by the member, an annular sealing rib formed on said portion, an elongated, sleeve-like, non-metallic sealing element secured at an edge thereof to the other member and extending in a substantially axial direction for a substantial distance toward and over said rib, being in sealing engagement therewith between the edges of said sealing element, and spring means coacting with said sealing element to maintain said sealing engagement.

3. A self-contained seal for application to a pair of relatively rotatable parts, comprising a pair of annular sheet metal housing members each adapted to be fixedly engaged respectively with one of said parts, said members being axially telescoped relative to one another and defining an annular seal housing of box-like cross section, one of the members having an axially extending re-entrant portion, an annular sealing rib formed on said portion, the other member having an annular recess opening internally of the housing in substantially spaced relation to said rib, an elongated, sleeve-like, non-metallic sealing element gripped at an edge thereof in said recess and extending in a substantially axial direction for a substantial distance toward and over said rib, being in sealing engagement therewith between the edges of said sealing element, and spring means coacting with said sealing element to maintain said sealing engagement.

THOMAS M. ULSETH.

REFERENCES CITED

The following references are of record in the file of this patent:

UNITED STATES PATENTS

| Number | Name | Date |
|---|---|---|
| 1,896,378 | Rockwell | Feb. 7, 1933 |
| 2,009,281 | Stein | July 23, 1935 |
| 2,089,462 | Winter | Aug. 10, 1937 |
| 2,171,968 | Augustin | Sept. 5, 1939 |
| 2,266,175 | Delaval-Crow | Dec. 16, 1941 |
| 2,320,794 | Pew | June 1, 1943 |

FOREIGN PATENTS

| Number | Country | Date |
|---|---|---|
| 637,097 | Germany | of 1936 |